(No Model.)
W. H. TINGLE, L. LEIBROCK & W. SEITZ.
ATTACHMENT FOR FAUCETS.
No. 389,614. Patented Sept. 18, 1888.
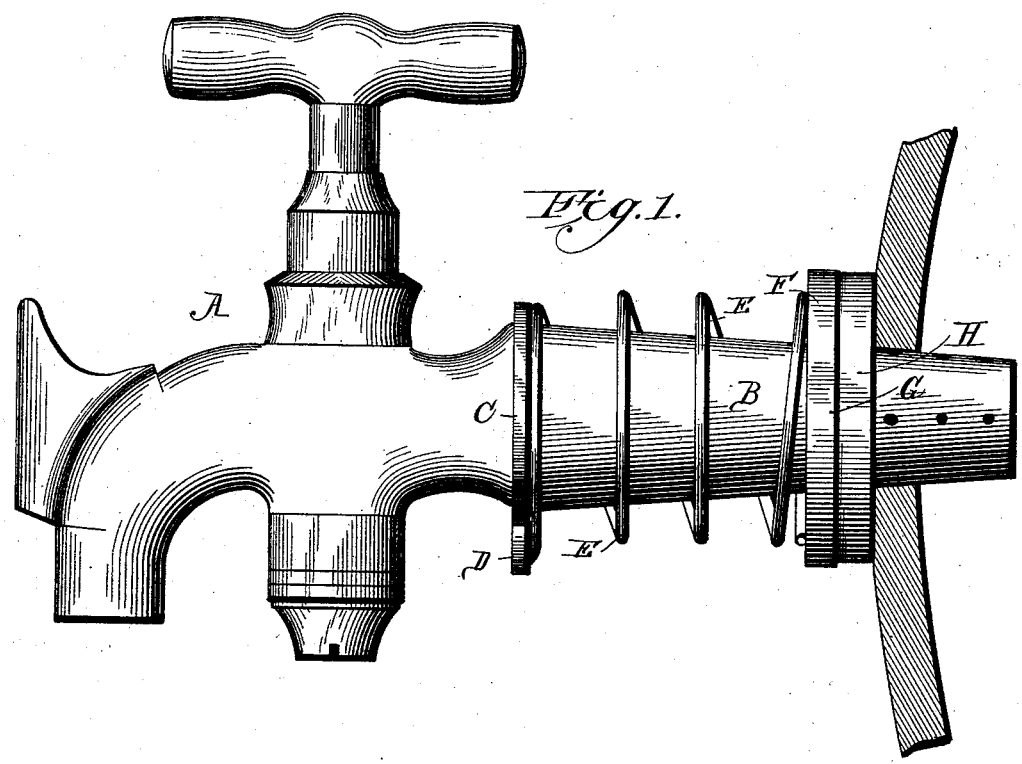
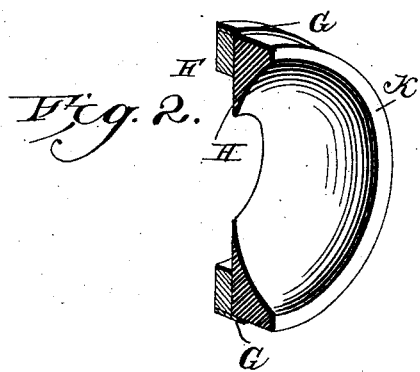
WITNESSES
INVENTORS

United States Patent Office.

WILLIAM HARVEY TINGLE, LOUIS LEIBROCK, AND WILLIAM SEITZ, OF DAYTON, OHIO.

ATTACHMENT FOR FAUCETS.

SPECIFICATION forming part of Letters Patent No. 389,614, dated September 18, 1888.

Application filed June 12, 1888. Serial No. 276,865. (No model.)

*To all whom it may concern:*

Be it known that we, WILLIAM HARVEY TINGLE, LOUIS LEIBROCK, and WILLIAM SEITZ, citizens of the United States, residing at Dayton, in the county of Montgomery and State of Ohio, have invented a new and useful Improvement in Attachments for Faucets, of which the following is a specification.

Our invention relates to an improvement in attachments for faucets; and it consists in the peculiar construction and combination of devices, that will be more fully set forth hereinafter, and particularly pointed out in the claim.

The object of our invention is to provide an attachment for the faucet whereby the faucet may be secured to a beer or ale keg or cask without permitting any of the liquid to escape therefrom.

In the drawings, Figure 1 is a side elevation of a faucet provided with an attachment embodying our improvements. Fig. 2 is a detail perspective view, partly in section, of the washer and follower.

A represents a beer-faucet of the usual construction, which has a tapered stem, B, that is adapted to be driven into the opening of the cask. At the inner end of the said tapered stem is secured a ring, C, which forms an annular flange, and is provided on one side with a projecting ear, D.

E represents a coiled extensile spring, which is arranged on the stem of the faucet and has one end attached to the ear. To the opposite end of the said spring is secured a follower-ring, F, which has a central opening, through which the stem extends, and which is of much greater diameter than the stem, and said ring is provided at its outer side with an annular flange, G.

H represents a circular washer, which is made of rubber or other suitable material, is provided with a central opening adapted to receive the stem of the faucet, has its inner side flat and adapted to bear against the follower-ring and to be confined by the flange thereof, and has its outer side concave, as shown, thereby providing the said washer with an annular lip, K, for the purpose to be hereinafter described.

The operation of our invention is as follows: When securing the faucet to the cask, the washer is first slipped onto the stem of the faucet and caused to lie in the follower-ring, and as the faucet is driven into the opening in the cask the spring exerts sufficient pressure on the follower-ring to keep the washer in such close contact with the cask and surrounding the opening therein as to prevent any of the liquid from escaping. The opening in the washer is sufficiently small to effect a water-tight joint with the stem of the faucet.

Having thus described our invention, we claim—

The combination, with a faucet provided with a smooth tapered stem, of the follower-ring F, mounted loosely on the stem and provided with a peripheral inward-extending flange, G, the extensile spring E, embracing the stem and bearing at its inner end against the follower-ring, and the elastic annular washer H, seated within the flange G and provided with a central opening smaller than that of the follower and fitting snugly around the stem, the said washer being further provided on its inner side with a cavity or recess forming the peripheral lip K, substantially as specified.

In testimony that we claim the foregoing as our own we have hereto affixed our signatures in presence of two witnesses.

WILLIAM HARVEY TINGLE.
  LOUIS LEIBROCK.
  WILLIAM SEITZ.

Witnesses:
 EDWARD BAKER,
 ALFRED GILBERT.